(12) United States Patent
Gan et al.

(10) Patent No.: US 11,804,069 B2
(45) Date of Patent: Oct. 31, 2023

(54) IMAGE CLUSTERING METHOD AND APPARATUS, AND STORAGE MEDIUM

(71) Applicant: BEIJING BAIDU NETCOM SCIENCE AND TECHNOLOGY CO., LTD., Beijing (CN)

(72) Inventors: Lu Gan, Beijing (CN); Yan Fu, Beijing (CN); Yangjie Zhou, Beijing (CN); Lianghui Chen, Beijing (CN); Shunnan Xu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 246 days.

(21) Appl. No.: 17/397,497

(22) Filed: Aug. 9, 2021

(65) Prior Publication Data

US 2021/0365713 A1   Nov. 25, 2021

(30) Foreign Application Priority Data

Feb. 26, 2021   (CN) .......................... 202110220248.9

(51) Int. Cl.
*G06V 40/16*   (2022.01)
*G06F 18/232*   (2023.01)
(Continued)

(52) U.S. Cl.
CPC ............ *G06V 40/168* (2022.01); *G06F 18/22* (2023.01); *G06F 18/23* (2023.01); *G06F 18/232* (2023.01);
(Continued)

(58) Field of Classification Search
None
See application file for complete search history.

(56) References Cited

U.S. PATENT DOCUMENTS

| 2003/0048950 A1* | 3/2003 | Savakis | G06F 16/583 |
| | | | 707/E17.02 |
| 2022/0019838 A1* | 1/2022 | Dou | G06V 10/40 |
| 2022/0188646 A1* | 6/2022 | Ramesh | G06F 18/232 |

FOREIGN PATENT DOCUMENTS

| CN | 104820718 A | 8/2015 |
| CN | 105574512 A | 5/2016 |

(Continued)

OTHER PUBLICATIONS

European Search Report dated Feb. 7, 2022 as received in application 21190467.7.
(Continued)

*Primary Examiner* — Emily C Terrell
*Assistant Examiner* — Nathan J Bloom
(74) *Attorney, Agent, or Firm* — Maschoff Brennan

(57) ABSTRACT

The disclosure provides an image clustering method and an image clustering apparatus. The method includes: obtaining new images, and clustering the new images to obtain a first cluster; determining a historical cluster similar to the first cluster as a second cluster from existing historical clusters; obtaining a distance between the first cluster and the second cluster; and generating a target cluster by fusing the first cluster and the second cluster based on the distance. In the image clustering method, with the image clustering apparatus of the disclosure, secondary clustering processing performed on the existing historical clusters based on newly added images is not required, new and old clusters are directly fused.

16 Claims, 4 Drawing Sheets

(51) Int. Cl.
*G06F 18/22* (2023.01)
*G06F 18/25* (2023.01)
*G06V 10/762* (2022.01)
*G06V 10/778* (2022.01)
*G06V 10/82* (2022.01)
*G06V 10/44* (2022.01)
*G06F 18/23* (2023.01)
*G06N 3/045* (2023.01)
*G06N 20/00* (2019.01)
*G06F 18/23213* (2023.01)
*G06F 18/2413* (2023.01)
*G06N 3/08* (2023.01)

(52) U.S. Cl.
CPC .. *G06F 18/23213* (2023.01); *G06F 18/24137* (2023.01); *G06F 18/25* (2023.01); *G06F 18/253* (2023.01); *G06N 3/045* (2023.01); *G06N 20/00* (2019.01); *G06V 10/454* (2022.01); *G06V 10/762* (2022.01); *G06V 10/763* (2022.01); *G06V 10/778* (2022.01); *G06V 10/82* (2022.01); *G06N 3/08* (2013.01)

(56) References Cited

FOREIGN PATENT DOCUMENTS

| | | |
|---|---|---|
| CN | 107220585 A | 9/2017 |
| CN | 107451597 A | 12/2017 |
| CN | 107729928 A | 2/2018 |
| CN | 109710728 A | 5/2019 |
| CN | 109801175 A | 5/2019 |
| CN | 110781957 A | 2/2020 |
| CN | 111291678 A | 6/2020 |
| WO | 2012140315 A1 | 10/2012 |
| WO | WO-2021036906 A1 * | 3/2021 |

OTHER PUBLICATIONS

Chinese Office Action dated Jul. 26, 2022 as received in application No. 202110220248.9.

Chinese Office Action dated Apr. 29, 2022 as received in application No. 202110220248.9.

Xu, et al., "Robust Recommendation Approach Based on Incremental Clustering and Matrix Factorization" Apr. 4, 2015.

* cited by examiner

IMAGE CLUSTERING METHOD AND APPARATUS, AND STORAGE MEDIUM

CROSS-REFERENCE TO RELATED APPLICATION

The present application is based upon and claims priority to Chinese Patent Application No. 202110220248.9, filed on Feb. 26, 2021, the entirety contents of which are incorporated herein by reference.

TECHNICAL FIELD

The disclosure relates to the fields of artificial intelligence technologies and big data technologies.

BACKGROUND

According to existing image clustering methods, mainly, image samples are obtained by sampling a large number of images, the image samples are clustered to obtain a centroid of each clustering result, un-sampled images or newly-added images are extracted from the large number of images and classified into existing clustering results by means of secondary clustering, to obtain a final clustering result. In order to classify the un-sampled images or newly-added images by means of the secondary clustering, the clustering process is implemented for multiple times, thus more resources are occupied and clustering timeliness is low.

SUMMARY

Embodiments of the disclosure provide an image clustering method. The method includes: obtaining new images, and clustering the new images to obtain a first cluster; determining a historical cluster similar to the first cluster as a second cluster from existing historical clusters; obtaining a distance between the first cluster and the second cluster; and generating a target cluster by fusing the first cluster and the second cluster based on the distance.

Embodiments of the disclosure provide an image clustering apparatus. The apparatus includes: one or more processors; a memory storing instructions executable by the one or more processors; in which the one or more processors are configured to: obtain new images, and cluster the new images to obtain a first cluster; determine a historical cluster similar to the first cluster as a second cluster from existing historical clusters; obtain a distance between the first cluster and the second cluster; and generate a target cluster by fusing the first cluster and the second cluster based on the distance.

Embodiments of the disclosure provide a non-transitory computer-readable storage medium storing computer instructions, the computer instructions are configured to make the computer implement an image clustering method. The method includes: obtaining new images, and clustering the new images to obtain a first cluster; determining a historical cluster similar to the first cluster as a second cluster from existing historical clusters; obtaining a distance between the first cluster and the second cluster; and generating a target cluster by fusing the first cluster and the second cluster based on the distance.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

Figure 1:
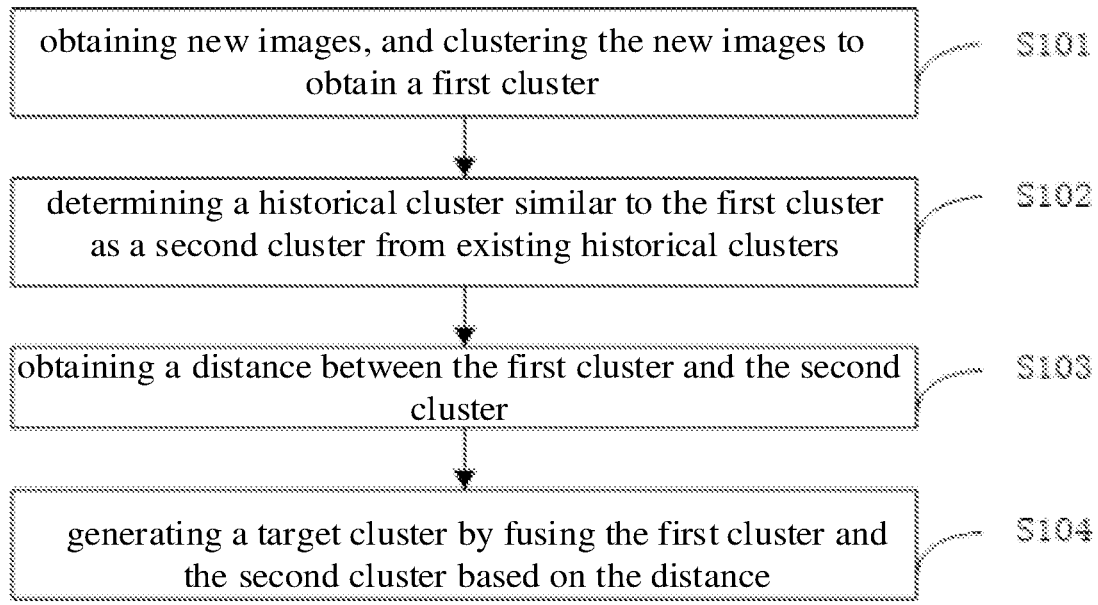
FIG. 1 is a flowchart of an image clustering method according to an embodiment of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Image processing is a technology that uses computers for image analyzation to achieve desired results. Image processing generally refers to digital image processing. Digital image refers to a large two-dimensional array obtained by shooting with industrial cameras, video cameras, scanners and other devices. The elements of the array are pixels, which are called gray values. Image processing generally includes three parts: image compression, enhancement and restoration, and matching, description and recognition.

Deep Learning (DL) is a new research direction in the field of Machine Learning (ML), which is introduced into ML to bring it closer to an original goal, i.e., artificial intelligence. DL is to learn internal laws and representation levels of sample data. The information obtained in the learning process is of great help to interpretation of data such as text, images and sounds. Its ultimate goal is to enable machines to have the ability to analyze and learn like humans, and to recognize data such as text, images and sounds. DL is a complex machine learning algorithm that has achieved results in speech and image recognition far surpassing the related art.

Computer vision is a science that studies how to make machines "see". Furthermore, computer vision refers to the use of cameras and computers instead of human eyes to identify, track, and measure machine vision for further graphics processing, so that an image that is more suitable for human eyes to observe or send to the instrument for inspection is obtained through computer processing. As a scientific discipline, computer vision studies related theories and technologies, to establish an artificial intelligence system that obtains "information" from images or multi-dimensional data. The information refers to information defined by Shannon that is used to help make a "decision". Since perception may be seen as extracting information from sensory signals, computer vision is seen as a science that studies how to make artificial systems "perceive" from images or multi-dimensional data.

Artificial Intelligence (AI for short) is a discipline that studies certain thinking processes and intelligent behaviors (such as learning, reasoning, thinking and planning) to make computers simulate life, which are both hardware-level technologies and software-level technologies. AI hardware technology generally includes computer vision technologies, speech recognition technologies, natural language processing technologies, and its learning/deep learning, big data processing technologies, knowledge graph technologies and other aspects.

FIG. 1 is a flowchart of an image clustering method according to an embodiment of the disclosure. As illustrated in FIG. 1, the image clustering method includes the following steps.

At step S101, new images are obtained, and the new images are clustered to obtain a first cluster.

Clustering is an unsupervised processing method that divides a collection of physical or abstract objects into multiple types composed of similar objects.

The newly-added images of the disclosure may be new images acquired by an image obtaining device, or un-sampled images in the existing images. After the newly-added images are acquired, the newly-added images are clustered, and finally the first cluster corresponding to the newly-added image is obtained. The first cluster may be one or more, which is determined according to actual image situation of the newly-added images.

In the disclosure, when clustering the newly-added images, feature information of the newly-added images are extracted, and clustering is performed based on the extracted feature information. The feature information of the image may include: facial features, human attributes, vehicle attributes, time attributes and so on. Optionally, the feature information may be extracted by the image recognition model to obtain the feature information of the image, and the feature information may be expressed in the form of a vector. Optionally, in order to improve efficiency of image feature extraction, a distributed clustering algorithm may be used to perform clustering on the newly-added images. For example, K-Means clustering, mean shift clustering, density-based clustering methods, maximum expected clustering using Gaussian mixture model, agglomerated hierarchical clustering, and graph group detection are adopted.

The following takes K-means clustering as an example to illustrate the image clustering process. K feature vectors are randomly selected as initial cluster centers. The randomly selected feature vectors are the feature vectors of K newly-added images, and the Euclidean distance between each cluster center and each feature vector in the newly-added image, a cluster center with the smallest Euclidean distance is determined as the same type. After clustering each feature vector in all newly-added images, its center is determined as the new cluster center, and this process is repeated until the cluster center no longer changes. One or more newly-added clusters corresponding to the newly-added images are obtained as the first cluster.

In the embodiments of the disclosure, the clustering is performed at a preset time node, for example, images are clustered every two hours, and the images added in these two hours are the new images. When the newly-added images have accumulated to a certain number, for example, when 10,000 new images are added, the images are clustered once, and the 10,000 images are the newly-added images. Two hours and 10,000 images are only examples here, which cannot be used as a condition to limit the disclosure.

At step S102, a historical cluster similar to the first cluster is determined as a second cluster from existing historical clusters.

In the embodiments of the disclosure, since clustering is performed at regular intervals or every time a certain number of images are added, that is, before each clustering, there are clusters generated by the previous clustering, clusters that already existed before each clustering are determined as the historical clusters. To obtain the historical cluster similar to the first cluster, the similar first cluster is fused with the historical cluster, and images with the same feature are clustered together.

For any first cluster, the feature vector of the cluster center image of the first cluster is compared with the feature vector of the cluster center image of the historical cluster to obtain the similarity between the first cluster and each historical cluster. For example, the feature vector of the cluster center image of the first cluster and the feature vector of the cluster center image of the historical cluster are obtained, and the Euclidean distance or cosine value of the feature vectors of the two cluster center images are obtained to measure the two similarities.

Further, a similarity threshold may be set in advance, and the similarity threshold is used to determine whether the two clusters are similar. The disclosure does not limit the specific value of the similarity threshold.

When the similarity between the first cluster and the historical cluster is greater than or equal to a preset similarity threshold, it indicates that the historical cluster is similar to the first cluster, and the historical cluster is regarded as the second cluster. It should be noted that there may be one or more second clusters corresponding to each first cluster. Generally, the higher the similarity threshold, the smaller the number of second clusters corresponding to the first cluster, and the lower the similarity threshold, the greater the number of second clusters corresponding to the first cluster.

At step S103, a distance between the first cluster and the second cluster is obtained.

In a possible implementation, the Euclidean distance between each new image in the first cluster and the cluster center is calculated, the image with the largest Euclidean distance from the cluster center in each direction is taken as the edge newly-added image of the first cluster. The Euclidean distance between each image in the second cluster and the cluster center of the cluster is calculated, and the image with the largest Euclidean distance from the cluster center in each direction is determined as the edge historical image of the second cluster. According to the feature vector of the newly-added edge image and the feature vector of the edge historical image, the minimum distance, the maximum distance or the average distance between the first cluster and the second cluster are calculated. It should be noted that the feature vector may be a vector of a specific feature, or fused vectors of multiple features.

In a possible implementation, after the first cluster and the second cluster are acquired, the distance between the first cluster and the second cluster is acquired. Optionally, an image that is the cluster center of the first cluster and an image that is the cluster center of the second cluster are acquired, and the distance between the two images is acquired as the distance between the first cluster and the second cluster.

In a possible implementation, take any newly-added image belonging to the first cluster as an example, the distance between any newly-added image and each image belonging to the second cluster is obtained, and then the average value of all the distances is obtained. The average value of the distance is used as the distance between the first cluster and the second cluster.

At step S104, a target cluster is generated by fusing the first cluster and the second cluster based on the distance.

In the disclosure, the Euclidean distance between the cluster centers of the first cluster and the second cluster is determined, and the distance is sorted from small to large in combination with the distance to obtain a sorting result. The second cluster with the smallest distance from the first cluster is used as the target second cluster to be merged, and the target second cluster and the first cluster are fused to obtain the fused cluster as the target cluster, and the cluster center is re-determined.

Taking the newly-added image as a face image as an example, the face images are clustered based on the facial features, so that the images belonging to the same person are aggregated together, and the aggregated target cluster is regarded as the image files of the same person. That is, image files of the same person are generated from the facial images in the target cluster. Taking the newly-added image as an animal image as an example, the animal images are clustered based on the extracted features, and finally image files of the same animal are generated.

In the image clustering method of the disclosure, the newly-added images are obtained, and the newly-added images are clustered to obtain the first cluster from the existing historical clusters, the historical cluster similar to the first cluster is determined as the second cluster. The distance between the first cluster and the second cluster is acquired, and the first cluster and the second cluster are fused based on the distance to generate the target cluster. The disclosure does not need to perform the secondary clustering processing on the existing historical clusters based on the newly-added images, the new and old clusters are fused directly, the newly-added images in the new cluster are fused into the historical clusters in batch, which not only solves the problem that secondary clustering occupies a large amount of resources, but also improves clustering efficiency of the newly-added images.

Figure 2:
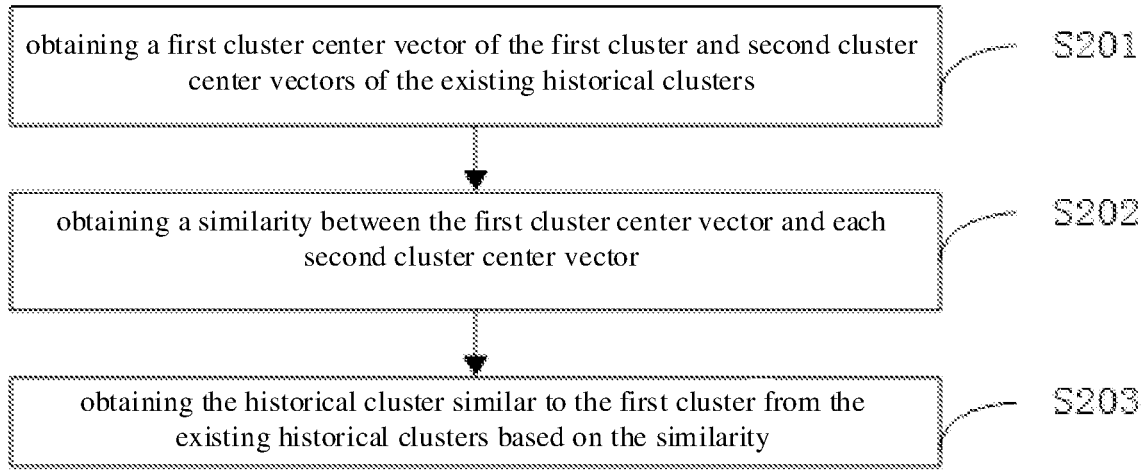
FIG. 2 is a flowchart of obtaining historical clusters according to an embodiment of the disclosure.

FIG. 2 is a schematic diagram of obtaining historical clusters according to an embodiment of the disclosure.

On the basis of the above embodiments, as illustrated in FIG. 2, obtaining the historical cluster similar to the first cluster from the existing historical clusters includes the following steps.

At step S201, a first cluster center vector of the first cluster and second cluster center vectors of the existing historical clusters are obtained.

The acquisition process of the first cluster center vector and the second cluster center vector are similar. New images and historical images that have been clustered are referred to as images to be clustered. Hereinafter, the images to be clustered are taken as example to illustrate the process of obtaining the cluster center vector.

In a possible implementation, according to the target feature vector of the images belonging to the same cluster, the cluster center vector is determined. When the image to be clustered is a newly-added image, the obtained cluster center vector is the first cluster center vector. When the image to be clustered is a historical image, the obtained cluster center vector is the second cluster center vector.

Taking the facial features as the feature information as an example, a CNN convolutional neural network model is used to perform feature extraction on the image, and an image set is input into a trained CNN model to extract a feature vector describing the image. For example, the face feature vector is used as the target feature vector. After the first cluster and the second cluster are determined, according to the face feature vectors of the newly-added images belonging to the first cluster, the first cluster center vector of the first cluster is determined. According to the face feature vectors of the historical images belonging to the historical cluster, the second cluster center vector of the historical cluster is determined.

In a possible implementation, multiple feature vectors corresponding to the feature information are extracted from the images to be clustered, and the feature information includes: facial features, human attributes, vehicle attributes and time attributes. The feature vectors are directly spliced or fused in the form of weight sum to obtain a fused result, which is used as a fused feature vector. According to the fusion feature vector of the images belonging to the same cluster, the cluster center vector is determined. When the image to be clustered is a newly-added image, the acquired cluster center vector is the first cluster center vector, and when the image to be clustered is a historical image, the acquired cluster center vector is the second cluster center vector.

It should be noted that the cluster center vector may be a vector corresponding to a centroid, the centroid is obtained by the average value of the Euclidean distances of all target feature vectors belonging to the cluster. Optionally, the centroid of the cluster is calculated first, and then the image to be clustered closest to the centroid is determined, and the target feature vector corresponding to the image to be clustered is used as the cluster center vector.

At step S202, a similarity between the first cluster center vector and each second cluster center vector is obtained.

Optionally, a cosine value of the first cluster center vector and the second cluster center vector is obtained, and the similarity between the two is measured through the cosine value.

At step S203, the historical cluster similar to the first cluster is obtained from the existing historical clusters based on the similarity.

Optionally, the similarity between the first cluster and each historical cluster is compared with the preset similarity threshold, and the historical cluster that exceeds the similarity threshold is selected as the similar historical cluster, that is, the second cluster. Optionally, the similarities between the first cluster and each historical cluster are sorted, and a certain number of historical clusters are ranked from large to small as the similar historical cluster, that is, the second cluster.

In the disclosure, the newly-added cluster center vector of the first cluster selects similar historical clusters from the historical clusters, which is conducive to fusion of subsequent clusters, and the clusters are preferentially fused into similar historical clusters, which improves accuracy of clustering.

Figure 3:
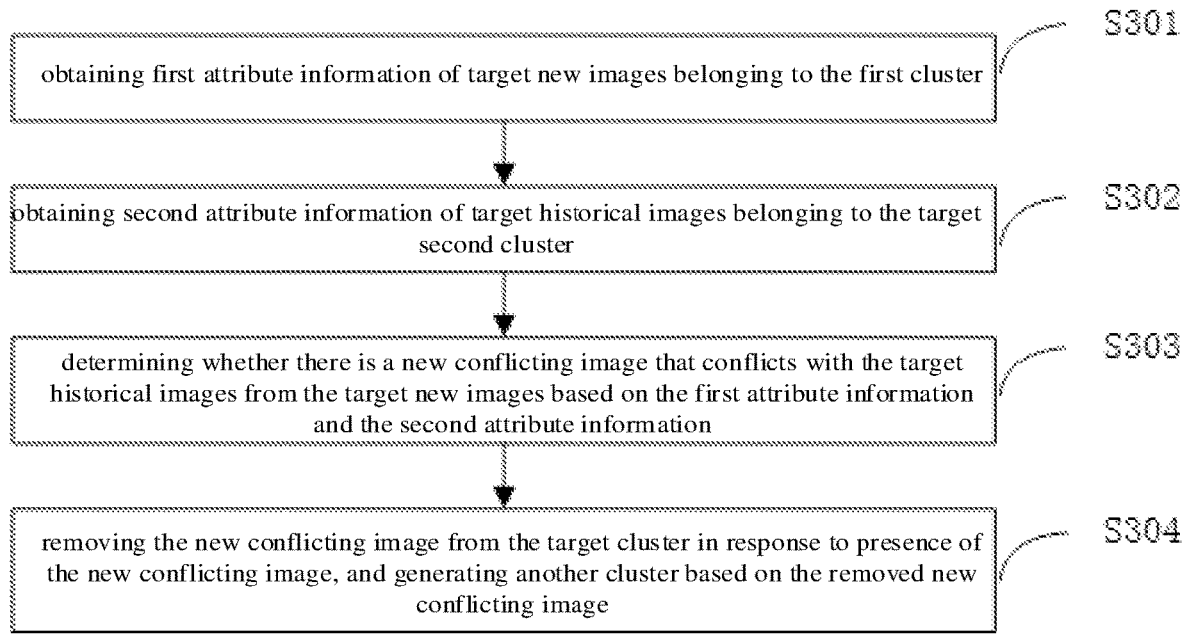
FIG. 3 is a flowchart of detaching new conflicting images from target clusters according to an embodiment of the disclosure.

FIG. 3 is a flowchart of an image clustering method according to the disclosure. Based on the above embodiments, the first cluster is fused into the target second cluster, and after the target cluster is generated, as illustrated in FIG. 3, the clustering method further includes the following steps.

At step S301, first attribute information of target new images belonging to the first cluster is obtained.

Optionally, taking the face image as an example, the attribute information may include clothing attributes, license plate attributes, spatiotemporal attributes, gender attributes and the like. Optionally, in the process of feature extraction using the CNN model, the attribute information of the image is extracted synchronously in the CNN.

It should be noted that the newly-added images belonging to the first cluster in the newly-added images are called target newly-added images. The newly-added target images belonging to the first cluster are extracted from the trained CNN model to describe the image, such as clothing color, license plate number information, spatiotemporal information, and/or gender information as the first attribute information.

Taking an image of a dog as an example, the attribute information may include the color of the dog, the type of the dog, the age of the dog, the residence of the dog, as the first attribute information.

At step S302, second attribute information of target historical images belonging to the target second cluster is obtained.

It should be noted that the historical images belonging to the target second cluster in the historical images are called target historical images, which is similar to the process of the first attribute information, and is not repeated here.

At step S303, it is determined whether there is a new conflicting image that conflicts with the target historical images from the target new images based on the first attribute information and the second attribute information.

Figure 4:
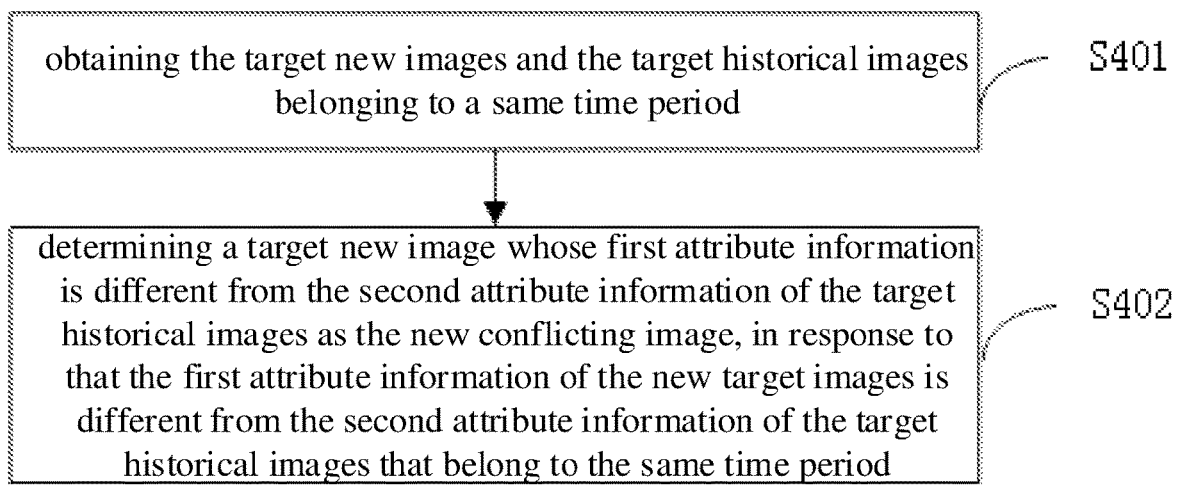
FIG. 4 is a flowchart of determining new conflicting images according to an embodiment of the disclosure.

As illustrated in FIG. 4, determining whether there is a new conflicting image that conflicts with the target historical images from the target new images based on the first attribute information and the second attribute information includes the following steps.

At step S401, the target new images and the target historical images belonging to a same time period are obtained.

Each image has its own generation time. Based on the generation time of the image, the target new images and the target historical images are classified by the time period, and the target new images and the target historical images that belong to the same time period are obtained. For example, all the new target images and the target historical images are extracted on Feb. 1, 2021, the acquired target new images and the target historical images are within the same time period.

At step S402, a target new image whose first attribute information is different from the second attribute information of the target historical images is determined as the new conflicting image, in response to that the first attribute information of the new target images is different from the second attribute information of the target historical images that belong to the same time period.

According to the first attribute information and the second attribute information, that is, from multiple aspects such as clothes color, license plate number information, and time and space information, it is determined whether there is a conflict between the newly-added target image and the target historical image. Generally, the attribute information of the same type of the same object is often the same in the same time period. If the attribute information of the newly-added target image and the attribute information of the target historical image are different in the same time period, it means that the newly-added target image and the target historical image may not belong to the same object. For example, the clothes of the same person in a day are often unchanged. Therefore, based on the color of the person's clothes in the newly-added target image and the color of the clothes in the target historical image belonging to the same day, it is determined whether there is a conflict between the new conflicting image and the target historical image in the target new image. That is, the newly-added image in which the clothes color in the target newly-added image is different from the clothes color in the target historical image, is determined as the new conflicting image. For example, if the license plate number of a certain target newly-added image is different from the license plate number in the target historical image, it is determined that the target newly-added image is a new conflicting image. For example, the location at a certain time point in the target newly-added image is displayed as Xinjiang, and the location at that time point in the target historical image is displayed as Hainan. Obviously, it is impossible for the same person to appear in two places with such a large distance at the same time, and then it is determined that the target newly-added image is a new conflictingly image.

At step S304, the new conflicting image is removed from the target cluster in response to presence of the new conflicting image, and another cluster is generated based on the removed new conflicting image.

If the first attribute information of the target newly-added image is different from the second attribute information of the target cluster, it means that the target newly-added image does not belong to the target cluster, and the target newly-added image is determined as the new conflicting image. The new conflicting image is labeled and removed from the target cluster. Further, since the new conflicting images are similarly newly-added images, it is possible to directly generate another cluster with the new conflicting images that are removed. Optionally, based on the initial attribute information of the new conflicting images, the new conflicting images may be divided to generate at least one cluster.

In the disclosure, by comparing the first attribute information of the target new images with the second attribute information of the target historical images, the target new images that does not belong to the target cluster are identified and determined as the new conflicting images, the new conflicting images are removed to generate another cluster. It is ensured that the image attribute information in the target cluster is the same. Optionally, taking a facial image as an example, the new conflicting images are identified and removed to generate another cluster, it is ensured that the images in the target cluster are all the whereabouts of the same person in a specific time period, which improves the accuracy of clustering.

Further, according to the cluster center of the target cluster obtained above, the Euclidean distance between each image in the target cluster and the cluster center of the target cluster is calculated, and the image with the smallest Euclidean distance is set as the identification image of the target cluster. The image selected as the identification image may be a new image newly clustered into the target cluster, or it may be a historical image clustered into the target cluster before.

Taking a portrait as an example, the images included in the final generated target cluster often belong to the same person. The images in the target cluster generate an image file of the person, and the portrait of the person closest to the cluster center in the target cluster may be used as the identification image of the person, and the identification image may be used as a cover of the person's profile.

In the embodiments of the disclosure, based on the manually labeled black and white lists of the target cluster, the images in the black and white lists may be used as trained image samples, which may be used to optimize the training of the image recognition model to obtain a model with better recognition accuracy.

Figure 5:
FIG. 5 is a flowchart of an image clustering method according to an embodiment of the disclosure.

FIG. 5 is a flowchart of an image clustering method according to an embodiment of the disclosure. As illustrated in FIG. 5, the image clustering method includes the following steps.

At step S501, new images are obtained, and the new images are clustered to obtain a first cluster.

At step S502, a first cluster center vector of the first cluster and second cluster center vectors of the existing historical clusters are obtained.

At step S503, a similarity between the first cluster center vector and each second cluster center vector is obtained.

At step S504, the historical cluster similar to the first cluster are selected from the existing historical clusters based on the similarity.

For specific introduction of the foregoing S502 to S504, please refer to the description of the related content of the step S102 in the foregoing embodiments, which is not repeated here.

At step S505, a distance between the first cluster and the second cluster is obtained.

At step S506, a target second cluster with the shortest distance to the first cluster is selected based on the distance, and the first cluster and the target second cluster are fused to generate the target cluster.

At step S507, first attribute information of target new images belonging to the first cluster is obtained.

At step S508, second attribute information of target historical images belonging to the target second cluster is obtained.

At step S509, the target new images and the target historical images belonging to a same time period are obtained.

At step S510, a target new image whose first attribute information is different from the second attribute information of the target historical images is determined as the new conflicting image, in response to that the first attribute information of the new target images is different from the second attribute information of the target historical images that belong to the same time period.

At step S511, the new conflicting image is removed from the target cluster in response to presence of the new conflicting image, and another cluster is generated based on the removed new conflicting image.

In the image clustering method of the disclosure, newly-added images are obtained, and the newly-added images are clustered to obtain the first cluster, a historical cluster similar to the first cluster is determined as a second cluster from existing historical clusters. A distance between the first cluster and the second cluster is obtained. A target cluster is generated by fusing the first cluster and the second cluster based on the distance. The disclosure does not need to perform secondary clustering processing on the existing historical clusters based on the newly-added images, the new and old clusters are fused directly, the newly-added images in the new cluster are fused into the historical clusters in batch, which not only solves the problem that secondary clustering occupies a large amount of resources, but also improves clustering efficiency of the newly-added images.

Optionally, the processing objects of the embodiments of the disclosure are not limited to images, and the same processing may be performed on other types of newly-added data.

In the technical solution of the disclosure, the acquisition, storage and application of user personal information involved are in compliance with relevant laws and regulations, and does not violate public order and good customs. The intention of this disclosure is to manage and process personal information data in a way that minimizes the risk of unintentional or unauthorized use and access. Risk is reduced to the minimum extent by restricting data collection and deleting data when the data is no longer needed. It should be noted that all information related to the personnel in the disclosure is collected with the knowledge and consent of the personnel.

Figure 6:
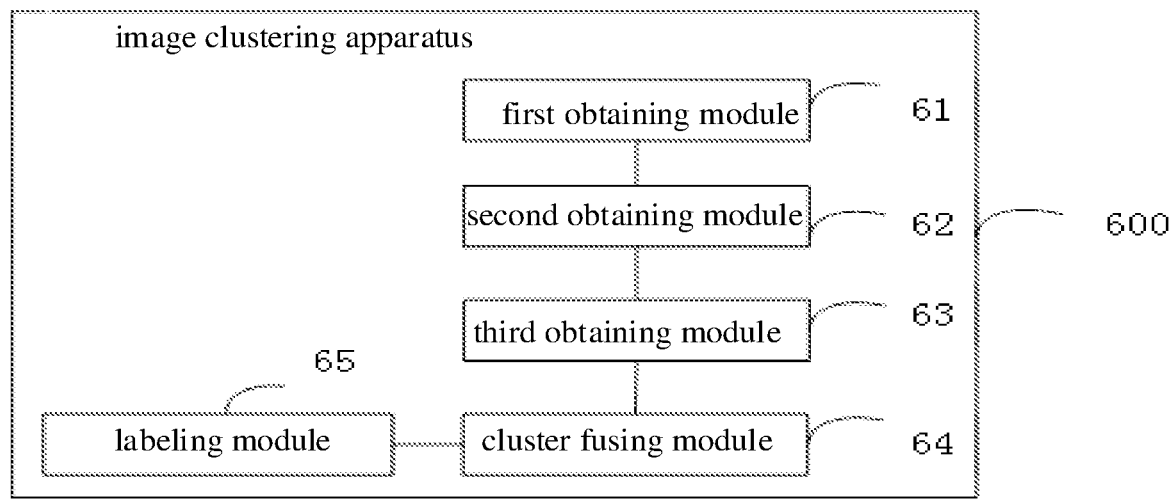
FIG. 6 is a schematic diagram of an image clustering apparatus according to an embodiment of the disclosure.

FIG. 6 is a schematic diagram of an image clustering apparatus 600 according to an embodiment of the disclosure. As illustrated in FIG. 6, the image clustering apparatus 600 includes: a first obtaining module 61, a second obtaining module 62, a third obtaining module 63 and a cluster fusing module 64. The first obtaining module 61 is configured to obtain new images, and cluster the new images to obtain a first cluster. The second obtaining module 62 is configured to determine a historical cluster similar to the first cluster as a second cluster from existing historical clusters. The third obtaining module 63 is configured to obtain a distance between the first cluster and the second cluster. The cluster fusing module 64 is configured to generate a target cluster by fusing the first cluster and the second cluster based on the distance.

It should be noted that the foregoing explanation of the embodiment of the image clustering method is also applicable to the image clustering apparatus of the embodiment, which is not repeated here.

With the image clustering apparatus of the disclosure, newly-added images are obtained, the new images are clustered to obtain a first cluster. A historical cluster similar to the first cluster is determined as a second cluster from existing historical clusters. A distance between the first cluster and the second cluster is obtained. A target cluster is generated by fusing the first cluster and the second cluster based on the distance. The disclosure does not need to perform secondary clustering processing on the existing historical clusters based on the newly-added images, the new and old clusters are directly fused. The newly-added images in the new cluster are fused into the historical clusters in batch, which not only solves the problem that secondary clustering occupies a large amount of resources, but also improves clustering efficiency of the newly-added images.

In a possible implementation, the second obtaining module 62 is further configured to: obtain a first cluster center vector of the first cluster and second cluster center vectors of the existing historical clusters; obtain a similarity between the first cluster center vector and each second cluster center vector; and obtain the historical cluster similar to the first cluster from the existing historical clusters based on the similarity.

In a possible implementation, the second obtaining module 62 is further configured to: extract a target feature vector from images to be clustered, and determine a cluster center vector according to a target feature vector of images belonging to the same cluster.

In a possible implementation, the second obtaining module 62 is further configured to: extract a face feature vector from the images to be clustered as the target feature vector in response to the images to be clustered carrying a face.

In a possible implementation, the second obtaining module 62 is further configured to: extract a plurality of feature vectors from the images to be clustered, and perform feature fusion on the plurality of feature vectors to generate a fused feature vector; and determine the cluster center vector based on a fused feature vector of images belonging to the same cluster.

In a possible implementation, the cluster fusing module 64 is further configured to: select a target second cluster with the shortest distance to the first cluster based on the distance, and fuse the first cluster and the target second cluster to generate the target cluster.

In a possible implementation, the cluster fusing module 64 is further configured to: obtain first attribute information of target new images belonging to the first cluster; obtain second attribute information of target historical images belonging to the target second cluster; determine whether there is a new conflicting image that conflicts with the target historical images from the target new images based on the first attribute information and the second attribute information; and remove the new conflicting image from the target cluster in response to presence of the new conflicting image, and generate another cluster based on the removed new conflicting image.

In a possible implementation, the cluster fusing module 64 is further configured to: obtain the target new images and the target historical images belonging to a same time period; and determine a target new image whose first attribute information is different from the second attribute information of the target historical images as the new conflicting image, in response to that the first attribute information of the new target images is different from the second attribute information of the target historical images that belong to the same time period.

In a possible implementation, the apparatus includes a labeling module 65, configured to determining the image closest to a cluster center of the target cluster as an identification image of the target cluster.

In a possible implementation, the third obtaining module 63 is further configured to: obtain new edge images belonging to the first cluster and located at edges of the first cluster; obtain historical edge images belonging to the second cluster and located at edges of the second cluster; and obtain the distance between the first cluster and the second cluster according to feature vectors of the new edge images and feature vectors of the historical edge images.

According to the embodiments of the disclosure, the disclosure also provides an electronic device, a readable storage medium and a computer program product.

Figure 7:
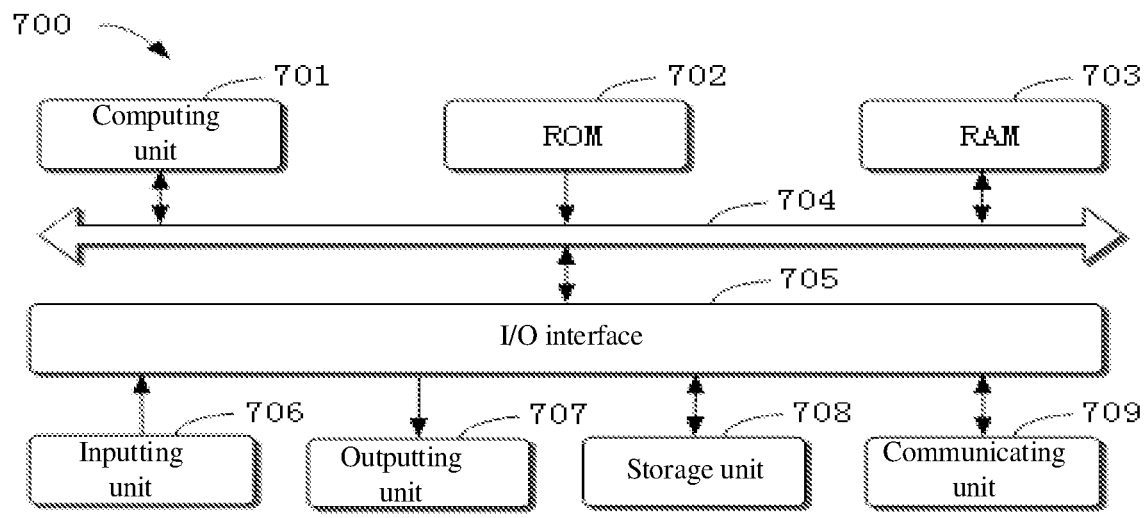
FIG. 7 is a schematic diagram of an electronic device according to an embodiment of the disclosure.

FIG. 7 is a block diagram of an electronic device 700 configured to implement the method according to embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 7, the device 700 includes a computing unit 701 performing various appropriate actions and processes based on computer programs stored in a read-only memory (ROM) 702 or computer programs loaded from the storage unit 708 to a random access memory (RAM) 703. In the RAM 703, various programs and data required for the operation of the device 700 are stored. The computing unit 701, the ROM 702, and the RAM 703 are connected to each other through a bus 704. An input/output (I/O) interface 705 is also connected to the bus 704.

Components in the device 700 are connected to the I/O interface 705, including: an inputting unit 706, such as a keyboard, a mouse; an outputting unit 707, such as various types of displays, speakers; a storage unit 708, such as a disk, an optical disk; and a communication unit 709, such as network cards, modems, wireless communication transceivers, and the like. The communication unit 709 allows the device 700 to exchange information/data with other devices through a computer network such as the Internet and/or various telecommunication networks.

The computing unit 701 may be various general-purpose and/or dedicated processing components with processing and computing capabilities. Some examples of computing unit 701 include, but are not limited to, a central processing unit (CPU), a graphics processing unit (GPU), various dedicated artificial intelligence (AI) computing chips, various computing units that run machine learning model algorithms, and a digital signal processor (DSP), and any appropriate processor, controller and microcontroller. The computing unit 701 executes the various methods and processes described above. For example, in some embodiments, the method may be implemented as a computer software program, which is tangibly contained in a machine-readable medium, such as the storage unit 708. In some embodiments, part or all of the computer program may be loaded and/or installed on the device 700 via the ROM 702 and/or the communication unit 709. When the computer program is loaded on the RAM 703 and executed by the computing unit 701, one or more steps of the method described above may be executed. Alternatively, in other embodiments, the computing unit 701 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), erasable programmable read-only memories (EPROM or flash memory), fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), the Internet and Block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve defects such as difficult management and weak business scalability in the traditional physical host and Virtual Private Server (VPS) service. The server may also be a server of a distributed system, or a server combined with a blockchain.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. An image clustering method, comprising:
obtaining new images, and clustering the new images to obtain a first cluster;
determining a historical cluster similar to the first cluster as a second cluster from existing historical clusters;
obtaining a distance between the first cluster and the second cluster; and
generating a target cluster by fusing the first cluster and the second cluster based on the distance;
wherein fusing the first cluster and the target second cluster to generate the target cluster, comprises:
obtaining first attribute information of target new images belonging to the first cluster;
obtaining second attribute information of target historical images belonging to the target second cluster;
obtaining the target new images and the target historical images belonging to a same time period;
determining a target new image whose first attribute information is different from the second attribute information of the target historical images as a new conflicting image, in response to that the first attribute information of the new target images is different from the second attribute information of the target historical images that belong to the same time period; and
removing the new conflicting image from the target cluster in response to presence of the new conflicting image, and generating another cluster based on the removed new conflicting image.

2. The method of claim 1, wherein determining the historical cluster similar to the first cluster from the existing historical clusters comprises:
obtaining a first cluster center vector of the first cluster and second cluster center vectors of the existing historical clusters;
obtaining a similarity between the first cluster center vector and each second cluster center vector; and
obtaining the historical cluster similar to the first cluster from the existing historical clusters based on the similarity.

3. The method of claim 1, further comprising:
extracting a target feature vector from images to be clustered, and determining a cluster center vector according to a target feature vector of images belonging to the same cluster.

4. The method of claim 3, further comprising:
extracting a face feature vector from the images to be clustered as the target feature vector in response to the images to be clustered carrying a face.

5. The method of claim 2, further comprising:
extracting a plurality of feature vectors from the images to be clustered, and performing feature fusion on the plurality of feature vectors to generate a fused feature vector; and
determining the cluster center vector based on a fused feature vector of images belonging to the same cluster.

6. The method of claim 1, wherein generating the target cluster by fusing the first cluster and the second cluster based on the distance, comprises:

selecting a target second cluster with the shortest distance to the first cluster based on the distance, and fusing the first cluster and the target second cluster to generate the target cluster.

7. The method of claim 1, further comprising:
determining the image closest to a cluster center of the target cluster as an identification image of the target cluster.

8. The method of claim 1, wherein obtaining the distance between the first cluster and the second cluster comprises:
obtaining new edge images belonging to the first cluster and located at edges of the first cluster;
obtaining historical edge images belonging to the second cluster and located at edges of the second cluster; and
obtaining the distance between the first cluster and the second cluster according to feature vectors of the new edge images and feature vectors of the historical edge images.

9. An image clustering apparatus, comprising:
one or more processors;
a memory storing instructions executable by the one or more processors;
wherein the one or more processors are configured to:
obtain new images, and cluster the new images to obtain a first cluster;
determine a historical cluster similar to the first cluster as a second cluster from existing historical clusters;
obtain a distance between the first cluster and the second cluster; and
generate a target cluster by fusing the first cluster and the second cluster based on the distance;
wherein the one or more processors are configured to:
obtain first attribute information of target new images belonging to the first cluster;
obtain second attribute information of target historical images belonging to the target second cluster;
obtain the target new images and the target historical images belonging to a same time period;
determine a target new image whose first attribute information is different from the second attribute information of the target historical images as a new conflicting image, in response to that the first attribute information of the new target images is different from the second attribute information of the target historical images that belong to the same time period; and
remove the new conflicting image from the target cluster in response to presence of the new conflicting image, and generate another cluster based on the removed new conflicting image.

10. The apparatus of claim 9, wherein the one or more processors are configured to:
obtain a first cluster center vector of the first cluster and second cluster center vectors of the existing historical clusters;
obtain a similarity between the first cluster center vector and each second cluster center vector; and
obtain the historical cluster similar to the first cluster from the existing historical clusters based on the similarity.

11. The apparatus of claim 10, wherein the one or more processors are configured to:
extract a target feature vector from images to be clustered, and determine a cluster center vector according to a target feature vector of images belonging to the same cluster.

12. The apparatus of claim 11, wherein the one or more processors are configured to:
extract a face feature vector from the images to be clustered as the target feature vector in response to the images to be clustered carrying a face.

13. The apparatus of claim 12, wherein the one or more processors are configured to:
extract a plurality of feature vectors from the images to be clustered, and perform feature fusion on the plurality of feature vectors to generate a fused feature vector; and
determine the cluster center vector based on a fused feature vector of images belonging to the same cluster.

14. The apparatus of claim 9, wherein the one or more processors are configured to:
select a target second cluster with the shortest distance to the first cluster based on the distance, and fuse the first cluster and the target second cluster to generate the target cluster.

15. The apparatus of claim 9, wherein the one or more processors are configured to:
determine the image closest to a cluster center of the target cluster as an identification image of the target cluster.

16. A non-transitory computer-readable storage medium storing computer instructions, wherein the computer instructions are configured to make the computer implement an image clustering method, and the method comprises:
obtaining new images, and clustering the new images to obtain a first cluster;
determining a historical cluster similar to the first cluster as a second cluster from existing historical clusters;
obtaining a distance between the first cluster and the second cluster; and
generating a target cluster by fusing the first cluster and the second cluster based on the distance;
wherein fusing the first cluster and the target second cluster to generate the target cluster, comprises:
obtaining first attribute information of target new images belonging to the first cluster;
obtaining second attribute information of target historical images belonging to the target second cluster;
obtaining the target new images and the target historical images belonging to a same time period;
determining a target new image whose first attribute information is different from the second attribute information of the target historical images as a new conflicting image, in response to that the first attribute information of the new target images is different from the second attribute information of the target historical images that belong to the same time period; and
removing the new conflicting image from the target cluster in response to presence of the new conflicting image, and generating another cluster based on the removed new conflicting image.

* * * * *